(12) United States Patent
Bernhardt et al.

(10) Patent No.: US 6,988,108 B2
(45) Date of Patent: Jan. 17, 2006

(54) SERVER SIDE SAMPLING OF DATABASES

(75) Inventors: Jeffrey R. Bernhardt, Woodinville, WA (US); Ilya Vinarsky, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/043,898

(22) Filed: Jan. 26, 2005

(65) Prior Publication Data

US 2005/0160073 A1 Jul. 21, 2005

Related U.S. Application Data

(63) Continuation of application No. 09/864,591, filed on May 24, 2001, now abandoned.

(51) Int. Cl.
G06F 17/30 (2006.01)

(52) U.S. Cl. .................. 707/102; 707/6; 707/10; 709/203

(58) Field of Classification Search .............. 707/6, 707/7, 10, 100–102, 104.1; 709/203, 219
See application file for complete search history.

(56) References Cited

U.S. PATENT DOCUMENTS

| | | | | |
|---|---|---|---|---|
| 5,727,199 A * | 3/1998 | Chen et al. | ..................... | 707/6 |
| 5,960,431 A * | 9/1999 | Choy | ............................. | 707/7 |
| 6,012,058 A * | 1/2000 | Fayyad et al. | ................. | 707/6 |
| 6,026,398 A * | 2/2000 | Brown et al. | ................... | 707/5 |
| 6,049,797 A * | 4/2000 | Guha et al. | ..................... | 707/6 |
| 6,236,985 B1 * | 5/2001 | Aggarwal et al. | ............. | 707/2 |
| 6,289,354 B1 * | 9/2001 | Aggarwal et al. | ....... | 707/104.1 |
| 6,347,310 B1 * | 2/2002 | Passera | ........................ | 706/25 |
| 6,449,612 B1 * | 9/2002 | Bradley et al. | ................. | 707/6 |
| 6,510,427 B1 * | 1/2003 | Bossemeyer, Jr. et al. | ...... | 707/6 |
| 6,519,604 B1 * | 2/2003 | Acharya et al. | ............ | 707/102 |
| 6,532,458 B1 * | 3/2003 | Chaudhuri et al. | ............ | 707/2 |
| 6,633,882 B1 * | 10/2003 | Fayyad et al. | ............. | 707/101 |
| 6,772,166 B1 * | 8/2004 | Hildreth | ..................... | 707/102 |
| 6,785,684 B2 * | 8/2004 | Adbo | ......................... | 707/101 |
| 6,889,221 B1 * | 5/2005 | Luo et al. | ...................... | 707/2 |
| 2002/0073138 A1 * | 6/2002 | Gilbert et al. | .............. | 709/201 |
| 2002/0152208 A1 * | 10/2002 | Bloedorn | ....................... | 707/6 |
| 2002/0198863 A1 * | 12/2002 | Anjur et al. | .................. | 707/1 |

OTHER PUBLICATIONS

Motwani et al., Randomized Algorithms, Mar. 1996, ACM, pp. 33-37.*
Wass et al., Counting Eumerating, and Sampling of Execution Plans in a Cost-Based Query Optimizer, Mar. 2000, ACM, p, 499-509.*
Karloff et al., Randomized Algorithms and Pseudorandom Numbers, Jul. 1993, ACM, pp 454-476.*
Ordonez, SEQLEM: Fast Clustering in SQL using the EM Algorithm, 2000, ACM, pp. 559-570.*
Snyder, Using Transact-SQL and Simulation Techniques to Create Virtual M&M's, 2002, ACM, pp. 153-164.*

* cited by examiner

Primary Examiner—Leslie Wong
(74) Attorney, Agent, or Firm—Microsoft Corporation

(57) ABSTRACT

A system and method for use with a data mining application for a large database having a large number of records. A selection attribute is chosen from one of a plurality of attributes contained by records within the database. Records are scanned in the database and a randomizing function is applied to the selection attribute of each record to create a randomized record value. A selection criteria is then applied to identify records for inclusion within a subset of records (smaller than the original data set) by comparing the randomized record value of each record with the selection criteria. The subset of records having a randomized record value satisfying the selection criteria approximates the entire database but takes up less memory and can be evaluated or scanned much more quickly.

12 Claims, 2 Drawing Sheets

SERVER SIDE SAMPLING OF DATABASES

CROSS REFERENCE TO RELATED APPLICATION

This application is a continuation application of U.S. patent application Ser. No. 09/864,591, filed May 24, 2001 now abandoned.

FIELD OF THE INVENTION

The present invention concerns data mining, which is the automated analysis of large databases to extract useful information such as models or predictors from data stored in the database.

BACKGROUND ART

Commercial databases have become a source of information for users in decision making of various types. It is useful, for example, in predicting consumers future buying habits to have access to data concerning their past buying behavior. As the size of these databases has grown, extracting useful information can become very difficult. An entire field known as data mining has emerged to enable users to access and interpret the data contained in large databases.

In many data mining problems, a goal is to make a rational decision given the information contained in a large amount of data. Presenting a visual depiction of the data for a human to enable he or she to make such decisions is one such problem. Automatically making many decisions is another. The large corpus of data can be the records of all customers' transactions in a grocery store chain with automated registers or an online bookstore having a huge inventory. Other examples might constitute records of all news stories read by the viewers on an online news site. The news site administrator might want to predict what stories would interest the viewer given what he or she has already read, and what advertisements to place on a web page given the advertisements the user has already clicked and the stories he or she has read. Or the store manager might want to know what customers in which demographic categories buy which items.

Although many algorithms for such problems are known and widely used (for example, Decision Trees and K-Means Clustering), they take too much time if trained on too much data. It has been observed that under certain circumstances, however, it may not be necessary to use an entire database (which can have many millions of records) to create a useful model or predictor. Instead a sample of a few tens of thousands of records might accurately represent the much larger data set of the entire database.

U.S. Pat. No. 6,012,058 to Fayyad et al., which issued Jan. 4, 2000 discloses one data mining process for clustering data. The disclosure of this patent is incorporated herein by reference. This patent discloses a clustering process that extracts sufficient statistics concerning a large database to produce a data clustering model that takes up far less memory than the entire database.

SUMMARY OF THE INVENTION

Popular database management systems such as Microsoft SQL Server or those from Oracle support the SQL query language and its most popular extensions. Using such a system, it is desirable to be able to quickly identify random subset of the data in a large database and run a data mining algorithm on the subset instead of the whole data set. The total time needed to model the data can be much smaller than the time it would take to run the analysis on the original (large) data set.

The invention allows a database management system to identify a subset of records within a database for purposes of representing that database. As an example, if the database has a million records, one can produce a subset of the database having only 10,000 records that for some purposes approximates the entire database.

In accordance with the invention a selection attribute is chosen from one of a plurality of attributes contained by records within the database. Records are scanned in the database and a randomizing function is applied to the selection attribute of each record to create a randomized record value. A selection criteria is then applied to identify records for inclusion within a subset of records (smaller than the original data set) by comparing the randomized record value of each record with the selection criteria. The subset of records having a randomized record value satisfying the selection criteria approximates the entire database but of course takes up less memory and can be evaluated or scanned much more quickly.

An ability to maintain the smaller data set in rapid access memory of a computer, for example, allows the data to be evaluated much more quickly. Also the smaller data set can be transmitted either through a local area network (LAN) or a wide area network (WAN) much more quickly. This means a server could apply the randomizing function and transmit a subset of data to a remotely located client that made a request for data.

In accordance with an exemplary embodiment of the invention the process of randomizing an attribute to provide a randomized record value is performed using an SQL statement that includes a randomizing function.

The invention will become better understood from the following detailed description of one exemplary embodiment of the invention when reviewed in conjunction with the drawings.

EXEMPLARY EMBODIMENT FOR PRACTICING THE INVENTION

Figure 2:
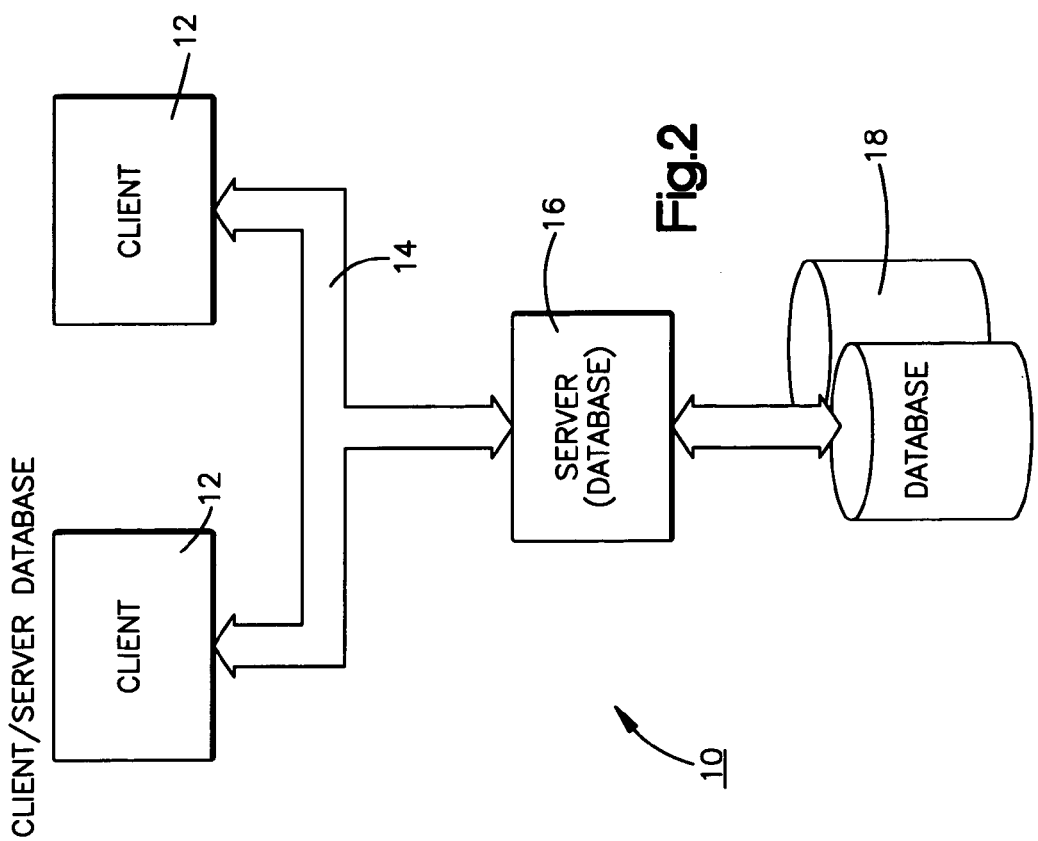
FIG. 2 is a representative depiction of a client/server computer architecture for use in data mining.

FIG. 2 illustrates an example of a suitable client/server system 10 for use with an exemplary embodiment of the invention. The system 10 is only one example of a suitable operating environment for practice of the invention. The system includes a number of client computing devices 12 coupled by means of a network 14 to a server computer 16. The server 16 in turn is coupled to a database 18 which is maintained on a possible large number of distributed storage devices for storing data records. The data records are maintained in tables that contain multiple number of records having multiple attributes or fields. Relations between tables are maintained by a database management system (DBMS) that executes on the server computer 16. The database management system is responsible for adding deleting and updating records in the database tables and also is responsible for maintaining the relational integrity of the data. Furthermore, the database management system can execute queries and send snapshots of data resulting from those queries to a client computer 12 that has need of a subset of data from the database 18.

Data from the database 18 is typically stored in the form of a table. If the data is "tabular", each row consists of a unique column called "case id" (which is the primary key in database terminology) and other columns with various attributes of the data. For example,

| Case Id | Name | Age | Favorite Author |
|---|---|---|---|
| 100 | Karlsson-on-the-Roof | 8 | Astrid Lindgren |
| 101 | Pippi Longstockings | 9 | Astrid Lindgren |
| 102 | Winnie the Pooh | 6 | Alan Milne |
| 103 | Peter Pan | 12 | J M Barrie |
| 104 | James Bond | 30 | Ian Fleming |
| 105 | Bilbo Baggins | 120 | J R R Tolkien |
| 106 | Big Totoro | 50 | Miyazaki Hayao |
| 107 | Middle Totoro | 100 | Miyazaki Hayao |
| 108 | Little Totoro | 200 | Miyazaki Hayao |

If the data is "transactional", each row consists of columns called "case id" and "attribute id", and possibly other information related to the transaction—the quantity of products bought, the time the viewer clicked on an advertisement. For example,

| Case Id | Product Id | Quantity |
|---|---|---|
| 100 | Propeller Pants | 2 |
| 100 | Machine Oil 100 ml Can | 4 |
| 101 | Hay, 40 lb pack | 100 |
| 106 | Toothpaste Tube | 1000 |

Note that in a "transactional" table, the case id alone is not the primary key of the table in database terminology—the pair {case id, product id} forms the primary key.

The present invention also applies to data that is neither "tabular" nor "transactional" but a mixture—it can be represented as a SQL join of two tables, one of which is tabular, and the other transactional. For example:

| Case Id | Name | Age | Product Id | Quantity |
|---|---|---|---|---|
| 100 | Karlsson-on-the-Roof | 8 | Propeller Pants | 2 |
| 100 | Karlsson-on-the-Roof | 8 | Machine Oil 100 ml Can | 4 |
| 101 | Pippi Longstockins | 9 | Hay, 40 lb pack | 100 |
| 106 | Big Totoro | 50 | Toothpaste Tube | 1000 |

In a "mixed" table, just like in a "transactional" table, the case id alone is also not the primary key of the table in database terminology—the pair {case id, product id} forms this primary key.

One goal of the invention is to identify a certain fraction of cases or records from a much larger data set. A case or a record is chosen either completely or not at all. In the above joined table example, the sample or subset of records should include the record of Karlsson's purchase of propeller pants and machine oil, or no record at all, but not an anomaly where only a part of the record is included. The cases included in the sample should be more or less evenly distributed throughout the table, and the total number of cases in the sample should be approximately equal to a desired number.

Figure 3:
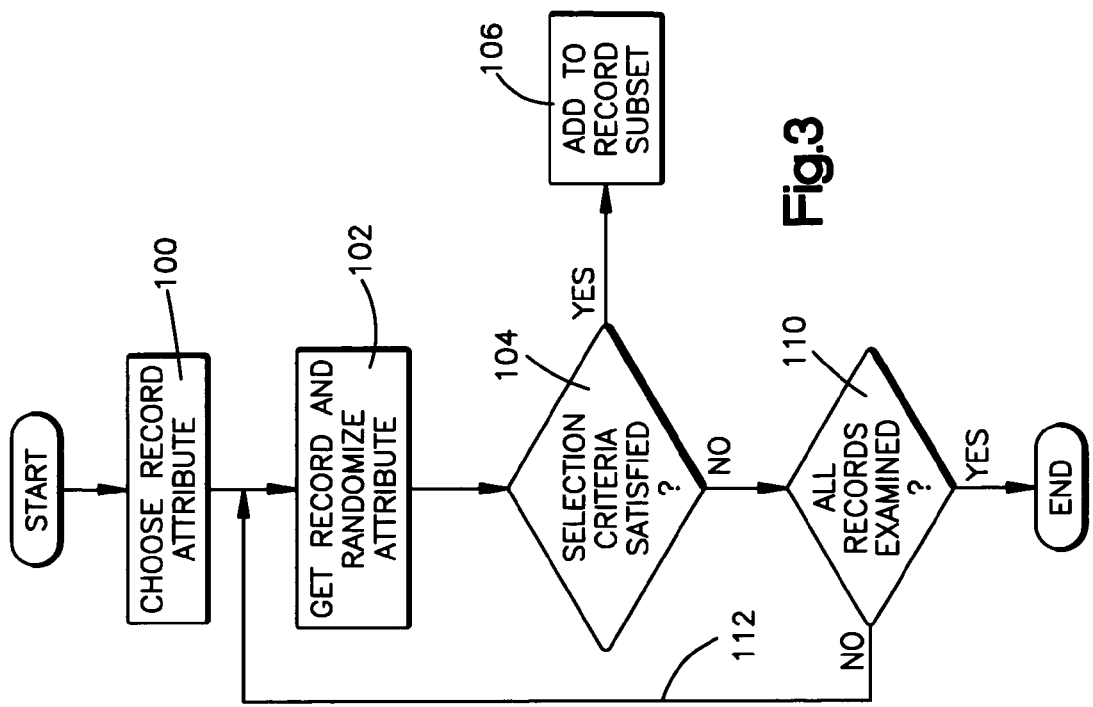
FIG. 3 is a flow chart illustrating steps performed in extracting a subset of records from a database of records during practice of an exemplary embodiment of the present invention.

FIG. 3 illustrates a sequence of steps for identifying a subset of records within the database 18 for purposes of representing that database. One wishing to characterize the database chooses 100 a selection attribute from one of a plurality of attributes contained in records within the database 18. Each of the records is then evaluated in turn by scanning the records from the database. During the scanning process a record is obtained and a randomizing function applied 102 to the attribute chosen at the step 100. The process next determines 104 if a selection criteria has been satisfied. If the selection criteria is satisfied the record is added 106 to a subset of records that have been identified as satisfying the selection criteria. A test 110 determines if all records have been evaluated. If they have not, a branch 112 is taken to get another record from the database 18. When all the records in the database have been evaluated, the process is complete and a subset of records satisfying the selection criteria has been identified.

Consider a set of records for example where the record's case id is an integer (has standard SQL type INTEGER, SMALLINT or NUMERIC, or Microsoft SQL Server 7 type INT, SMALLINT or DECIMAL). Other attribute types are also possible and are considered later.

Suppose also that the database management system running on the server 16 supports an extension to the SQL-92 standard, a RAND function that takes an integer argument and returns a uniformly distributed random number, such that the result depends on the argument deterministically. Microsoft SQL Server 7 has such a function.

Such a function makes it possible to perform the following steps:

1. Find the number of distinct cases in the table through a SQL query such as SELECT COUNT(DISTINCT CID) FROM TAB where CID is the name of the case id column, and TAB is the name of the table.
2. Calculate the fraction of the table in the sample by dividing the desired number of cases in the sample by the result of the first step. For example, if one wishes to run a data mining algorithm on a sample of 50000 cases, and the table has 1000000 (one million) cases or records, the desired fraction is 0.05.
3. Create a view on the table using this SQL query: SELECT*FROM TAB WHERE RAND(CID^1234) <0.05 where CID is the name of the case id column, TAB is the name of the table, 0.05 is the fraction calculated in the second step, and 1234 is the value of a parameter, introduced so that two queries with different parameters would yield different samples. (In the above expression, the '^' symbol causes SQL server to perform a bitwise Exclusive OR operation between its operands)

4. Run the data mining algorithm or analysis on the view obtained during the third step. This view has a smaller data subset than the original table.

This procedure clearly satisfies the first criterion (a case is chosen either completely or not at all). It would also satisfy the second and the third criteria (the cases should be distributed more or less evenly; the number of cases in the sample is approximately the desired total) if function RAND depended on its argument truly randomly. However, this is not the case with Microsoft SQL version 7. For example, RAND(1)=0.713592, RAND(2)=0.713611, RAND(3)=0.713629 etc. (rounded to 6 significant digits). To work around this feature the exemplary embodiment of the invention modifies the selection expression to make it more complicated. The following expression works well with Microsoft SQL Server 7:

RAND(1000000000*RAND(CID^1234))<0.05 where the rest of the SQL query is as above.

Note that the SELECT statements in both step 1 and 3 will take time linear in the size of the table, and will be particularly fast if the table is sorted by case id, or has an index on it.

Now consider a table where the case id is not an integer, but a binary string with a maximum length. Typically, only a few bits of the case id change from one case to the next. Under these circumstances, this expression works well with Microsoft SQL Server 7 if the maximum string length is 16 (or an equivalent expression with other database management systems):

RAND(1000000000*RAND(CAST(SUBSTRING(CID, 1,4) AS
INTEGER)^CAST(SUBSTRING(CID,5,4) AS
INTEGER)^CAST(SUBSTRING(CID,9,4) AS
INTEGER)^CAST(SUBSTRING(CID,13,4) AS INTEGER)^1234))<0.05 where everything is as above.

Now consider the case of a table where the case id is an SBCS or a DBCS character string (SQL-92 types CHAR and VARCHAR) or a Unicode character string (SQL-92 types NCHAR and NCHAR VARYING) with a maximum length. In this case, the same selection expression can be used as when the case id is binary, except the case id has to be cast to the binary type. For example, it would have to be used if the case id in our sample tables was the name of the fairy-tale character rather than an integer.

The most general selection expression, independent of the type of the case id, in the dialect of SQL supported by Microsoft SQL Server 7 depends on the properties of function NEWID, which returns a unique 16-byte binary string (more precisely, a value of type UNIQUEIDENTIFIER that can be converted to a 16-byte binary string without loss of information) every time it is called.

CID IN (SELECT CID FROM (SELECT Q2.CID,
RAND(1000000000*RAND(
CAST(SUBSTRING(CAST(Q2.G AS BINARY),1,4) AS INTEGER)^
CAST(SUBSTRING(CAST(Q2.G AS BINARY),5,4) AS INTEGER)^
CAST(SUBSTRING(CAST(Q2.G AS BINARY),9,4) AS INTEGER)^
CAST(SUBSTRING(CAST(Q2.G AS BINARY),13,4) AS INTEGER)^1234)) P
FROM (SELECT CID, NEWID( ) G FROM TAB Q3 GROUP BY Q3.CID) Q2) Q1
WHERE Q1.P<0.05)

This is the most general expression; however, it is also the slowest. The simpler expressions above are preferably used when the type of a case id is known to be an integer, a binary string, or a character string.

It is possible to rewrite the above queries in a number of ways, as the SQL language permits, but the above is the most efficient if the database management system implements the SQL language in a reasonable way.

Computer System

Figure 1:
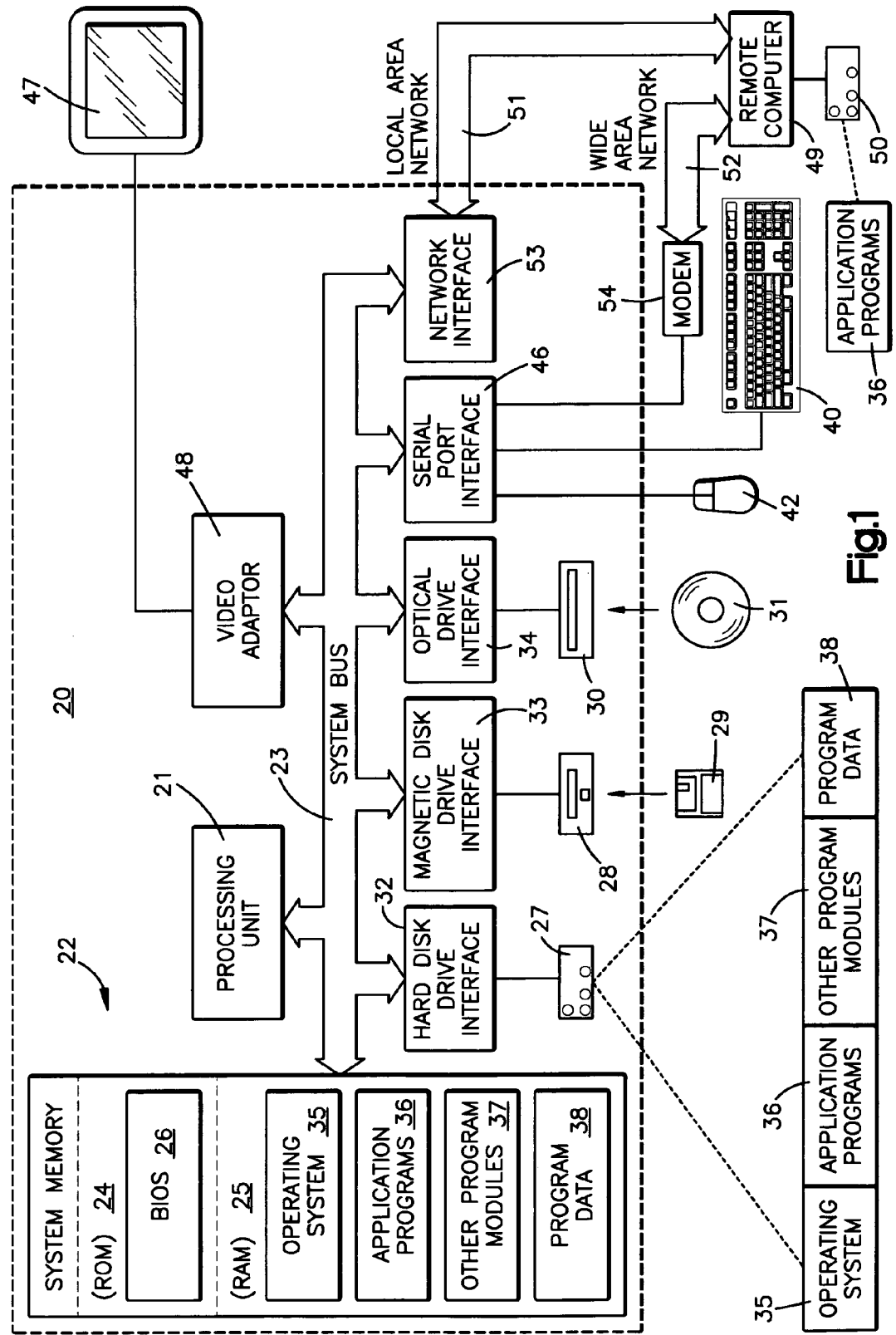
FIG. 1 is a depiction of a representative computing device for use in practicing the invention.

With reference to FIG. 1 an exemplary embodiment of the invention is practiced using a general purpose computing device 20. Such a computing device is used to implement both the client 12 and the server 16 depicted in FIG. 2. The device 20 includes one or more processing units 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures.

The system memory includes read only memory (ROM) 24 and random access memory (RAM) 25. A basic input/output system 26 (BIOS), containing the basic routines that helps to transfer information between elements within the computer 20, such as during start-up, is stored in ROM 24.

The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

While the exemplary embodiment of the invention has been described with a degree of particularity, it is the intent that the invention include all modifications and alterations from the disclosed design falling within the spirit or scope of the appended claims.

What is claimed is:

1. A computer implemented method of identifying a subset of records within a database for purposes of representing the database comprising:
   choosing a selection attribute from one of a plurality of attributes contained in records within the database;
   scanning records in the database and applying a RAND function to the selection attribute of each record to create a randomized record value; and
   applying a selection criteria to identify records for inclusion within a subset of records by comparing the randomized record value of each record with the selection criteria "criteria", wherein the selection attribute contains a numeric value and additionally comprising scaling the numeric value with a factor before applying the RAND function.

2. The method of claim 1 wherein the selection attribute contains a text string that is used as an input parameter to the RAND function.

3. The method of claim 1 wherein the scanning of records and applying the selection criteria is implemented by an SQL statement that includes a RAND function.

4. The method of claim 1 wherein the subset of records that represent the database are transmitted from a server computer to a client computer by means of a network.

5. The method of claim 4 additionally the client performs a data mining analysis on the subset of data that is transmitted to the client by means of the network.

6. Client/Server computer apparatus comprising:
   one or more client computers coupled to a network and including communications instructions for requesting a data set by means of the network; and
   a server computer coupled to the network and having access to a database having a number of records, the server computer including instructions for sending the data set made up of a subset of the records in the database to a client computer via the network;
   the server computer including instructions for scanning records in the database, applying a RAND function to a specified record attribute of each record in the database to produce a randomized record value, wherein the specified record attribute contains a numeric value and additionally comprising scaling the numeric value with a factor before applying the RAND function and comparing the randomized record value with a selection criteria to determine whether to include the specified record in the subset of records from the database for transmission via the network to the client; and an SQL language interpreter for converting requests from a client to an SQL statement including a RAND function.

7. The Client/Server computer apparatus of claim 6 wherein the client determines the selection criteria and transmits the selection criteria to the server for use in building the subset of records from the database.

8. A computer readable medium including instructions for identifying a subset of records within a database for purposes of representing the database, the computer readable medium comprising instructions for:
   choosing a selection attribute from one of a plurality of attributes contained by records with the database;
   scanning records in the database and applying a RAND function to the selection attribute of each record to create a randomized record value; and
   applying a selection criteria to identify records for inclusion within a subset of records by comparing the randomized record value of each record with the selection criteria wherein the selection attribute contains a numeric value and additionally comprising instructions for scaling the numeric value with a factor before applying the RAND function.

9. The computer readable medium of claim 8 wherein the selection attribute contains a text string that is used by the instructions as an input parameter to the RAND function.

10. The computer readable medium of claim 8 wherein the scanning of records and applying the selection criteria are performed by instructions that implement an SQL statement that includes a RAND function.

11. The computer readable medium of claim 8 wherein the instructions transmit a subset of records that represent the database from a server computer to a client computer by means of a network.

12. The computer readable medium of claim 8 additionally comprising instructions for performing a data mining analysis on the subset of data that is transmitted to the client by means of the network.

* * * * *

UNITED STATES PATENT AND TRADEMARK OFFICE
CERTIFICATE OF CORRECTION

PATENT NO. : 6,988,108 B2  Page 1 of 1
APPLICATION NO. : 11/043898
DATED : January 17, 2006
INVENTOR(S) : Jeffrey R. Bernhardt et al.

It is certified that error appears in the above-identified patent and that said Letters Patent is hereby corrected as shown below:

On the title page, item (56), under "Other Publications", in column 2, line 3, delete "Counting Eumerating" and insert -- Counting, Enumerating --, therefor.

In column 1, line 7, after "2001" insert -- , --.

In column 5, line 7, after "operands)" insert -- . --.

In column 7, line 40, in Claim 1, delete "computer implemented" and insert -- computer-implemented --, therefor.

In column 7, line 49, in Claim 1, after "within" delete "a" and insert -- the --, therefor.

In column 7, line 51, in Claim 1, after "criteria" delete ""criteria"".

In column 8, line 41, in Claim 8, after "within" delete "a" and insert -- the --, therefor.

Signed and Sealed this

Eighteenth Day of August, 2009

David J. Kappos
*Director of the United States Patent and Trademark Office*